March 19, 1957  J. W. HERMENZIE  2,786,194
SIGNAL DEVICE FOR AUTOMOBILE IGNITION SYSTEMS
Filed Sept. 30, 1955

INVENTOR.
JOSEPH W. HERMENZIE
BY
McMorrow, Berman + Davidson
ATTORNEYS

2,786,194

SIGNAL DEVICE FOR AUTOMOBILE IGNITION SYSTEMS

Joseph W. Hermenzie, Southport, Conn.

Application September 30, 1955, Serial No. 537,672

3 Claims. (Cl. 340—52)

This invention relates to a signal device which, summarized briefly, comprises an assembly mountable upon a vehicle steering column or other portion of a vehicle adjacent the ignition lock of the vehicle, with the device being designed to provide a visual and audible signal whenever the key is in its off or locking position.

In many instances, automobiles are stolen by reason of the forgetfulness of the operator in leaving the ignition key in the ignition switch while the vehicle is left unattended. In many instances, one will turn the ignition key to an off position and will then forget to remove the key when leaving the vehicle. As a result, an open invitation is left for one to steal the vehicle and thefts of automobiles under these conditions are quite common.

In view of the above, the main object of the present invention is to provide a signalling device to be disposed adjacent the ignition key, which device will provide both a visual and audible signal whenever the key is in an off position, so as to provide a reminder that cannot go unnoticed that the key is in the switch in an off position. The device formed according to the present invention is accordingly so arranged that when one turns off the vehicle engine by moving the key to an off position, the visual and audible signal will be energized, and will remain energized until the key is removed before the vehicle operator leaves the automobile.

A more specific object of the invention is to provide a device of the nature referred to which can be connected in the electrical system of the vehicle with a minimum amount of difficulty, and which will further be adapted to be mounted upon a selected portion of the vehicle with maximum ease and speed.

Still another object is to provide a device of the nature referred to which will be capable of being manufactured at relatively low cost, will operate efficiently in every instance to provide a signal whenever the key is turned to an off position, and will be comparatively inconspicuous, due to its location on the steering column of the vehicle in most installations.

Another object of importance is to provide a device of the nature referred to which can be readily modified to be usable on different makes of vehicles, merely by the change of a bracket constituting one of the components of the device.

Other objects will appear from the following description, the claims appended thereto, and from the annexed drawing, in which like reference characters designate like parts throughout the several views, and wherein:

Figure 1:
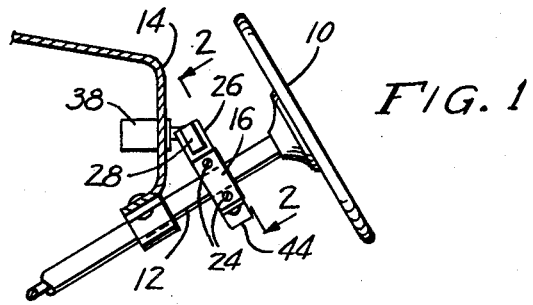
Figure 1 is a side elevational view of a device formed according to the present invention, as it appears when mounted upon a steering column, the steering column being shown fragmentarily in side elevation, the instrument panel of the vehicle being illustrated in transverse section.

Designated at 10 is a steering wheel, mounted upon a conventional steering column 12. At 14 there has been designated a conventional instrument panel of the vehicle.

The device constituting the present invention includes a bracket composed of a first bracket portion 16 having a substantially semicircular recess 18 receiving a complementary portion of the circumference of the steering column 12. The bracket portion 16 is formed as a block of plastic or similar material, and at 20 there has been designated a second bracket portion often formed as a block of plastic material or the like.

Formed in the block 16, at opposite ends thereof, are smooth-walled, countersunk bores, registering with threaded bores provided in the block portion 20. Connecting screws 24 are extended through the smooth-walled bores, and are threadedly engaged in the bores of block portion 20, said connecting screws, when threaded into the bores of block portion 20 to their maximum extent, being adapted to draw the bore portions toward one another into clamping relationship to the steering column 18 in close proximity to the instrument panel 14.

Secured by rivets or equivalent fastening elements to an outwardly projecting extension of the block portion 20 is an angle bracket 26.

Angle bracket 26 has a portion projecting upwardly from the extension of block portion 20, and secured to the upwardly extending part of the angle bracket is a hollow, rectangular switch housing 28 in which is pivotably mounted a switch element 30. Element 30 is formed of electrically insulative material, and secured to the midlength part of element 30 is a switch contact 31 adapted to engage a switch contact 32 when element 30 is swung to the position thereof shown in Figure 2. A compression spring 34 is interposed between the free end of element 30 and a wall housing 28, and normally urges element 30 to a position in which its contact 31 is out of engagement with contact 32.

Axially shiftable within housing 28 is a plunger 36 having an inner end within the housing bearing against the free end portion of element 30. The outer end of the plunger is engageable by the edge part of the head of the ignition key 40 of the vehicle, said key being extendable in the usual manner into the ignition switch 38 of the vehicle. In the illustrated example, the key when in its off position is inclined as shown in full lines in Figure 2. Under these circumstances, the side of the head part of the key bears against plunger 36 shifting the plunger inwardly of the housing 28 and causing the switch arm or element 38 to be swung to a circuit-closing position. This causes a signal lamp 42 mounted in block portion 20 to be illuminated, and at the same time, a buzzer 44 also attached to block portion 20 is energized.

Figure 2:
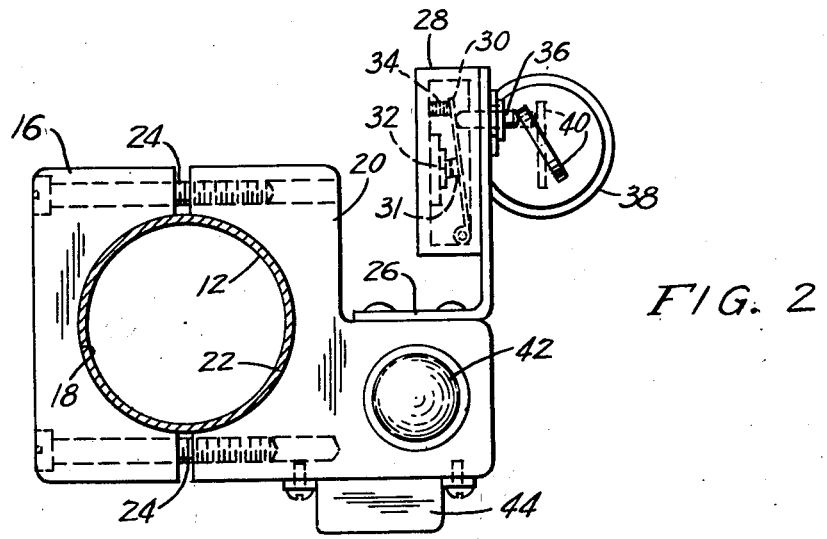
Figure 2 is an enlarged sectional view through the steering column of line 2—2 of Figure 1, showing the device in front elevation, the dotted lines showing the ignition key in on position and in full lines in off position.

As particularly well shown in Figure 2, the bracket means comprising bracket portions 16, 20 and angle bracket 26, is rotatably adjustable about the axis of the steering column due to the provision of a circular column-receiving opening defined by recesses 18, 22 of the bracket portions. Plunger 36 is spaced a substantial distance away from the axis of rotatable adjustment, and hence will travel in an arcuate path during adjustable positioning of the bracket means. This will in turn permit selective positioning of the plunger 36 relative to the rotatable head of the key 40, so that one can accurately locate the plunger relative to the key head. Minute variations in the different positions of the plunger are thus possible.

Further, the bracket means is shiftable axially of the steering column. Rotatable and axial adjustments of the bracket means can thus be effected either individually of or in combination with each other. This further aids in properly locating the plunger relative to the key head. In every instance, the plunger will be depressible in a straight path lying chordally of the arc travelled by the opposite side edges of the key head about the axis of the key rotation. Said path in which the plunger is depressed, further, lies in perpendicularly intersecting relation to a line drawn radially from the axis of rotatable adjustment of the bracket means.

Figure 3:
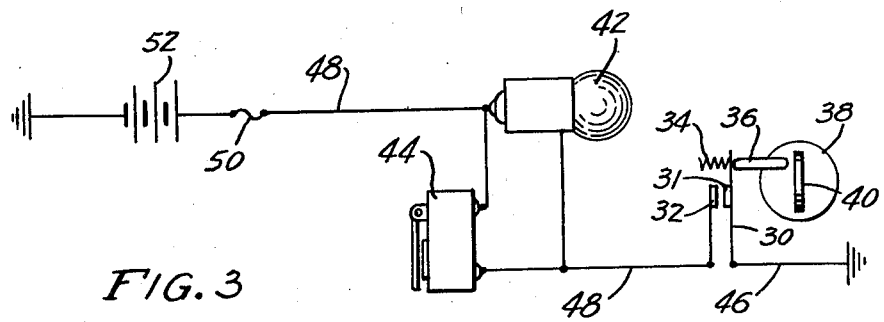
Figure 3 is a schematic diagram showing the circuit employed in the device.

In Figure 3 there is shown the circuit employed in the device. This includes a lead 46 connected between the switch arm 30 and ground. Extended from the contact 32 is a lead 48, and connected in parallel in said lead 48 are the signal lamp and buzzer. A fuse 50 is also connected in the lead 48 and extends to one of the posts of the vehicle battery 52, the other post having a connection to ground.

Due to this arrangement, the circuit will be open whenever the ignition key is removed from the ignition switch, and will also be open whenever said key is in its on position. The circuit will be closed whenever the key is in the switch and is in an off position, thus causing the buzzer and the lamp to be simultaneously energized. As a result, a double signal will be given the vehicle operator providing him with a reminder that the ignition key should be removed.

The connection of the lamp and buzzer in parallel will insure that a signal will be provided even should one of these be defective or burn out. Further, the use of a buzzer provides a type of signal that cannot go unnoticed, as distinguished from a lamp alone, which might not be noticed in bright daylight, and further might not be noticed should the operator not be looking down at the device.

It will be understood that the device can be used on any make of vehicle having an ignition key turnable between on and off positions. In some instance, the key may be located at some distance away from the steering column, and under these circumstances, the only change needed in the device is to modify the construction of the support bracket so that the plunger will be disposed adjacent the ignition key. Apart from this change, the device in every instance would be formed as illustrated and described herein.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a device for providing a signal when the ignition key of an automobile is in off position, the combination, with a vehicle steering column and with an ignition key having a flat-surfaced head, said key being rotatable between on and off positions in spaced relation to said column, said key in its on position having the head thereof disposed in a vertical plane, of: bracket means having an opening, said steering column extending through the opening and the bracket means being rotatably adjustable upon the steering column; switch means carried by the bracket means and including a plunger depressible to a switch-closing position, said plunger extending laterally toward one side of the key head and being under spring bias tending to dispose the same, when in a normal switch-opening position, close to one of said surfaces of the key head in the path travelled by the key head during rotation of the key to an off poistion, said one surface of the key head cammingly biasing the plunger from its normal position in a straight path responsive to turning of the key head out of its vertical plane to an off position, thus to depress the plunger to a switch-closing position, said plunger being spaced from the axis of rotation of the bracket means and therefore travelling in an arcuate path about said axis on rotatable adjustment of the bracket means, for selective positioning of the plunger relative to the key head; and signal means in circuit with the switch means so as to be energized responsive to turning of the ignition key to its off position.

2. In a device for providing a signal when the ignition key of an automobile is in off position, the combination, with a vehicle steering column and with an ignition key having a flat-surfaced head, said key being rotatable between on and off positions in spaced relation to said column, said key in its on position having the head thereof disposed in a vertical plane, of: bracket means having an opening, said steering column extending through the opening and the bracket means being rotatably adjustable upon and slidable axially of the steering column; switch means carried by the bracket means and including a plunger depressible to a switch-closing position, said plunger extending laterally toward one side of the key head and being under spring bias tending to dispose the same, when in a normal switch-opening position, close to one of said surfaces of the key head in the path travelled by the key head during rotation of the key to an off position, said one surface of the key head cammingly biasing the plunger from its normal position in a straight path responsive to turning of the key head out of its vertical plane to an off position, thus to depress the plunger to a switch-closing position, said plunger being spaced from the axis of rotation of the bracket means and therefore travelling in an arcuate path about said axis on rotatable adjustment of the bracket means, for selective positioning of the plunger relative to the key head, responsive to rotatable and slidable adjustments of the bracket means on the steering column; and signal means in circuit with the switch means so as to be energized responsive of turning of the ignition key to the off position thereof.

3. In a device for providing a signal when the ignition key of an automobile is in off position, the combination, with a vehicle steering column and with an ignition key having a flat-surfaced head, said key being rotatable between on and off positions in spaced relation to said column, said key in its on position having the head thereof disposed in a vertical plane, of: bracket means having an opening, said steering column extending through the opening and the bracket means being rotatably adjustable upon and slidable axially of the steering column; switch means carried by the bracket means and including a plunger depressible to a switch-closing position and extending into the path travelled by the key head during rotatable movement of the key to an off position, said plunger being spaced from the axis of rotation of the bracket means and therefore travelling in an arcuate path about said axis on rotatable adjustment of the bracket means, for selective positioning of the plunger relative to the key body, responsive to rotatable and slidable adjustments of the bracket means on the steering column, said plunger being depressible in a straight path extending chordally of the arc travelled by opposite side edges of the key head about the axis of key rotation, said last-named path perpendicularly intersecting a line drawn radially from the axis of rotatable adjustment of the bracket means, said plunger extending laterally toward one side of the key head and being under spring bias tending to dispose the same, when in a normal switch-opening position, close to one of said surfaces of the key head in the path travelled by the key head during rotation of the key to an off position, said one surface of the key head cammingly biasing the plunger from its normal position in a straight path responsive to turning of the key head out of its vertical plane to an off position, thus to depress the plunger to a switch-closing position; and signal means in circuit with the switch means so as to be energized responsive to turning of the ignition key to the off position thereof.

References Cited in the file of this patent
UNITED STATES PATENTS

| | | |
|---|---|---|
| 2,536,918 | Dorfman | Jan. 2, 1951 |
| 2,613,258 | Azano | Oct. 7, 1952 |